United States Patent
Agrawal

(10) Patent No.: US 9,965,961 B2
(45) Date of Patent: May 8, 2018

(54) EN-ROUTE FLIGHT PATH OPTIMIZATION

(71) Applicant: AIRBUS GROUP INDIA PRIVATE LIMITED, Bangalore (IN)

(72) Inventor: Ashutosh Agrawal, Bangalore (IN)

(73) Assignee: AIRBUS GROUP INDIA PRIVATE LIMITED, Bangalore, Karnataka (IN)

( * ) Notice: Subject to any disclaimer, the term of this patent is extended or adjusted under 35 U.S.C. 154(b) by 0 days. days.

(21) Appl. No.: 15/249,508

(22) Filed: Aug. 29, 2016

(65) Prior Publication Data
US 2017/0092136 A1    Mar. 30, 2017

(30) Foreign Application Priority Data

Sep. 30, 2015 (IN) ............... 5236/CHE/2015

(51) Int. Cl.
| G08G 5/00 | (2006.01) |
| G01C 21/00 | (2006.01) |
| G06Q 10/00 | (2012.01) |
| G01C 21/02 | (2006.01) |
| G01C 21/20 | (2006.01) |
| G06Q 10/04 | (2012.01) |

(52) U.S. Cl.
CPC ........... G08G 5/0039 (2013.01); G01C 21/02 (2013.01); G01C 21/20 (2013.01); G06Q 10/047 (2013.01); G08G 5/0013 (2013.01); G08G 5/0021 (2013.01); G08G 5/0026 (2013.01); G08G 5/0034 (2013.01); G08G 5/0052 (2013.01); G08G 5/0091 (2013.01); G08G 5/0078 (2013.01)

(58) Field of Classification Search
CPC ........... G08G 5/00; G01C 21/00; G06Q 10/00
See application file for complete search history.

(56) References Cited

U.S. PATENT DOCUMENTS

| 7,546,206 B1 * | 6/2009 | Miller | G01C 21/00 701/120 |
| 9,424,755 B2 * | 8/2016 | Bailey | G08G 5/0039 |
| 9,443,434 B2 * | 9/2016 | Hale | G08G 5/003 |
| 9,472,106 B2 * | 10/2016 | Bailey | G08G 5/0039 |
| 9,530,320 B2 * | 12/2016 | Bailey | G08G 5/0013 |

* cited by examiner

Primary Examiner — Yonel Beaulieu
(74) Attorney, Agent, or Firm — Prakash Nama; Global IP Services, PLLC

(57) ABSTRACT

A method for en-route flight path optimization is disclosed. A plurality of alternate flight paths between an origin and a destination of the aircraft in flight is determined based on real-time weather data, air traffic conflict data, and air space constraint data. Further, flight time savings and fuel savings for each of the plurality of alternate flight paths with respect to an actual path is computed. Furthermore, an optimal flight path from the plurality of alternate flight paths is determined based on the computed flight time savings, fuel savings, and a priority for the flight time savings and the fuel savings.

13 Claims, 5 Drawing Sheets

EN-ROUTE FLIGHT PATH OPTIMIZATION

RELATED APPLICATIONS

Benefit is claimed under 35 U.S.C. 119(a)-(d) to Foreign application Ser. No 5236/CHE/2015 filed in India entitled "EN-ROUTE FLIGHT PATH OPTIMIZATION", on Sep. 30, 2015, by AIRBUS GROUP INDIA PRIVATE LIMITED, which is herein incorporated in its entirety by reference for all purposes.

TECHNICAL FIELD

Embodiments of the present subject matter generally relate to flight path optimization, and more particularly, to the en-route flight path optimization for fuel savings and/or flight time savings.

BACKGROUND

A flight plan is a document filled by a pilot, a flight dispatcher, an air traffic controller, or any other aviation authority prior to departure of an aircraft. The flight plan may include information, such as departure date, tissue, and an origin and a destination airport. In addition, the flight plan may include aircraft identification number and aircraft type, an estimated time to complete an aircraft journey, a path to be followed by the aircraft, a listing of alternate airports for use in the event of bad weather, pilot's name, and number of people on board. Further, the flight plan may include weather forecast information, 3 dimensional or 4 dimensional trajectory data, and cost index based on fuel savings and flight time savings.

Typically, flight planning is performed couple of hours before take-off. Flight planning includes identifying the most optimized route prior to take-off. As a result, the weather forecast information used in the flight planning may be outdated during flying. Moreover, due to weather changes, the chosen route may be sub-optimal. Further, in an event of bad weather, the aircraft may end up consuming more fuel than what was predicted before take-off of the aircraft, which may lead to a shortage of fuel to complete the intended aircraft journey. Furthermore, the aircraft may end-up taking more time than the estimated time to complete the aircraft journey.

SUMMARY

In one embodiment, a method for en-route flight path optimization is disclosed. A plurality of alternate flight paths between an origin and a destination of the aircraft in flight is determined based on real-time weather data, air traffic conflict data, and air space constraint data. Further, flight time savings and fuel savings for each of the plurality of alternate flight paths with respect to an actual path based on the real time weather data is computed. Furthermore, an optimal flight path from the plurality of alternate flight paths is determined based on the computed flight time savings, the fuel savings, and a priority for the flight time savings and the fuel savings.

In another embodiment, an en-route flight path optimization system is disclosed. The en-route flight path optimization system includes a processor and memory coupled to the processor. The memory includes an en-route flight path optimization module. The en-route flight path optimization module includes instructions. The en-route flight path optimization module determines alternate flight paths between an origin and a destination of an aircraft in flight based on real-time weather data, air traffic conflict data, and air space constraint data. Further, the en-route flight path optimization module computes flight time savings and fuel savings for each of the alternate flight paths with respect to an actual flight path based on the real-time weather data. Furthermore, the en-route flight path optimization module determines an optimal flight path from the alternate flight paths based on the computed flight time savings, the fuel savings and a priority for the flight time savings and the fuel savings.

Yet, in another embodiment, a non-transitory computer-readable medium is disclosed. The non-transitory computer-readable medium has computer executable instructions stored thereon for en-route flight path optimization. The instructions are executable by a processor. The processor determines alternate flight paths between an origin and a destination of an aircraft in flight based on real time weather data, air traffic conflict data, and air space constraint data. Further, the processor computes flight time savings and fuel savings for each of the alternate flight paths with respect to an actual path based on the real-time weather data. Furthermore, the processor determines an optimal flight path from the plurality of alternate flight paths based on the computed flight time savings, the fuel savings and a priority for the flight time savings and the fuel savings.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Generally, flight plans are generated prior (e.g., 2 to 3 hours prior) to the departure of aircrafts. Also, weather forecasting to determine weather conditions in a predicted path is performed prior (e.g., 6 to 8 hours prior) to the departure of the aircrafts. Therefore, the predicted path may be outdated due to weather changes during the aircraft journey. Hence, the predicted path may be fuel and/or time inefficient.

Example systems utilize dynamic direct routing. In direct routing, direct routes are continuously scanned during real-time flight operation, and a flight crew and an airline's operation center are alerted every time a fuel efficient flight path opens up along an intended path of the aircraft flight. The terms "route" and "path" are used interchangeably throughout the document.

Figure 1:
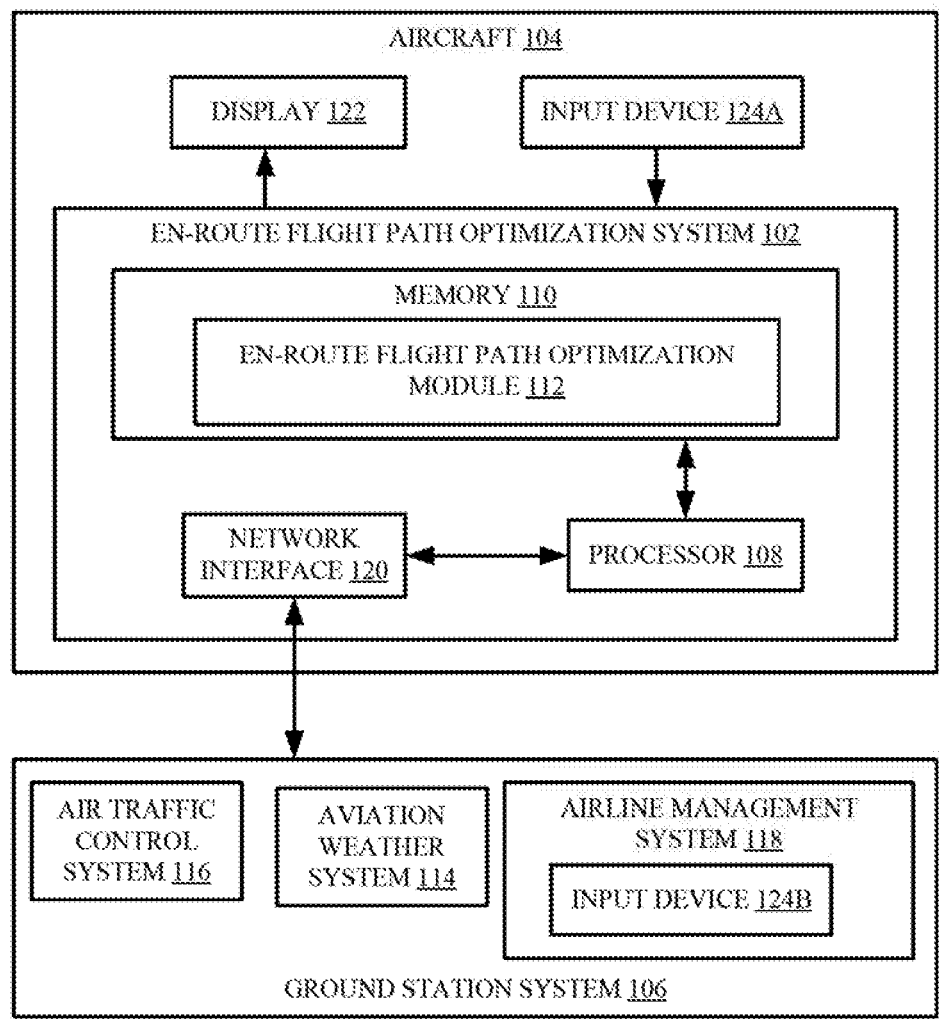
FIG. 1 is an example block diagram illustrating an en-route flight path optimization system disposed in an aircraft and communicating with a ground station system for real time optimization of the flight path.

FIG. 1 illustrates a block diagram 100 showing an en-route flight path optimization system 102 disposed in an aircraft 104, in accordance with an embodiment. The en-route flight path optimization system 102 may include a processor 108 and memory 110 coupled to the processor 108. The memory 110 may include an en-route flight path optimization module 112. For example, the en-route flight path optimization module 112 can be in the form of instructions stored in the memory 110. The en-route flight path optimization system 102 may include a network interface 120. The processor 108 may be coupled to the network interface 120.

In addition, as shown in FIG. 1, the network interface 120 is communicatively coupled to the ground station system 106. The ground station system 106 may include an air traffic control/monitoring system 116, an aviation weather system 114, and an airline management system 118. The airline management system 118 may include an input device 124B for enabling airline authority to provide priority for the time savings and the fuel sayings for the optimization of the flight path. In examples described herein, the network interface 120 may be a hardware device to communicate over at least one computer network. In some examples, the network interface 120 may be a Network interface Card (NIC) or the like. Example computer network may include a Virtual Private Network WPM, the Internet, WIFI, satellite network, aircraft data network, aeronautical telecommunications network (ATN), or the like, or a combination thereof in some examples, the computer network may include a telephone network (e.g., a cellular telephone network).

Moreover, as shown in FIG. 1, the aircraft 104 includes a display 122 coupled to the en-route flight path optimization system 102. Furthermore, as shown in FIG. 1, the aircraft 104 may include an input device 124A for enabling, a pilot to provide priority for the time savings and the fuel savings for the optimization of the flight path.

Figure 2:
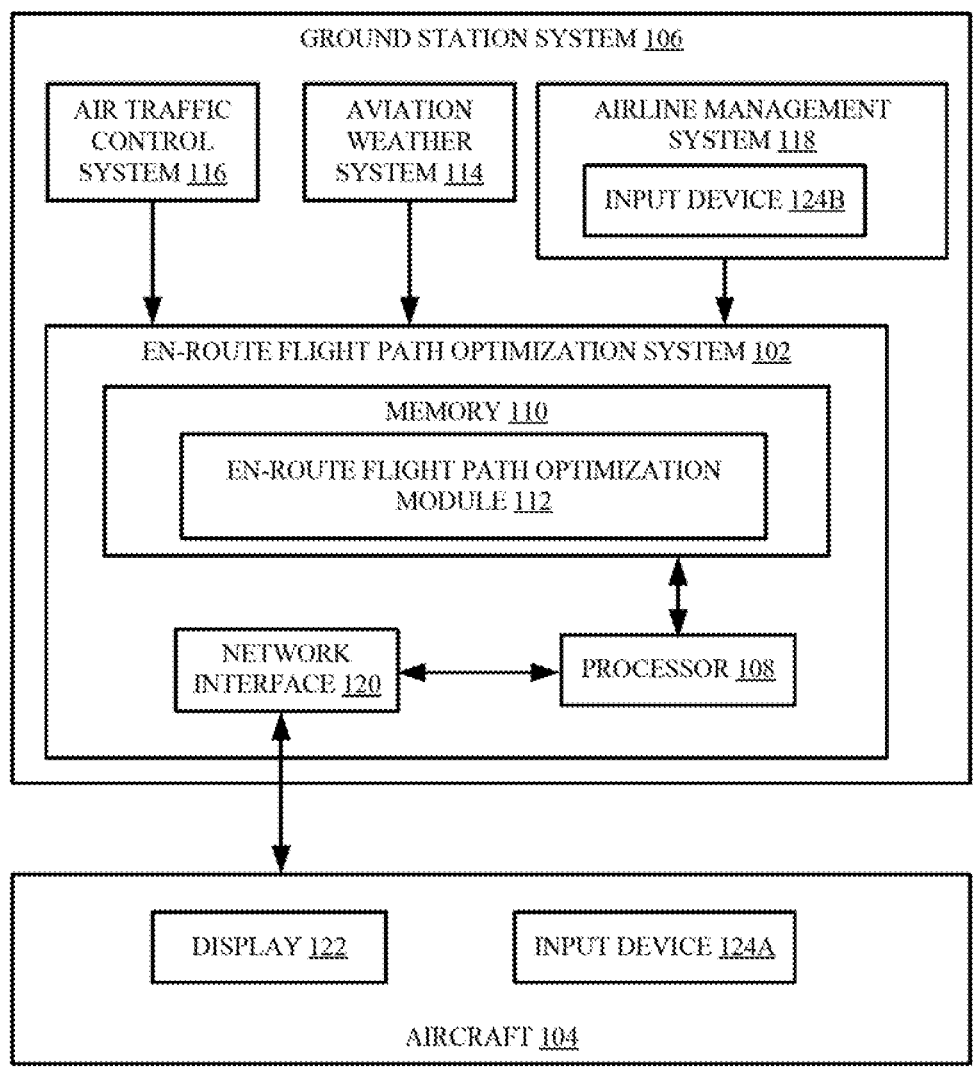
FIG. 2 is an example block diagram illustrating an en-route flight path optimization system disposed in a ground station system and communicating with an aircraft for real time optimization of the flight path.

Referring now to FIG. 2 which illustrates a block, diagram 200 showing an en-route flight path optimization system 102 disposed at a ground station system 106 and communicating with an aircraft 104 for real time optimization of the flight path, in accordance with an embodiment. In this case, the network interface 120 of the en-route flight path optimization system 102 may be coupled to the aircraft 104 for sending optimal route information to the aircraft 104.

An example operation of the en-route flight path optimization system 102 will now be described with reference to FIG. 3.

Figure 3:
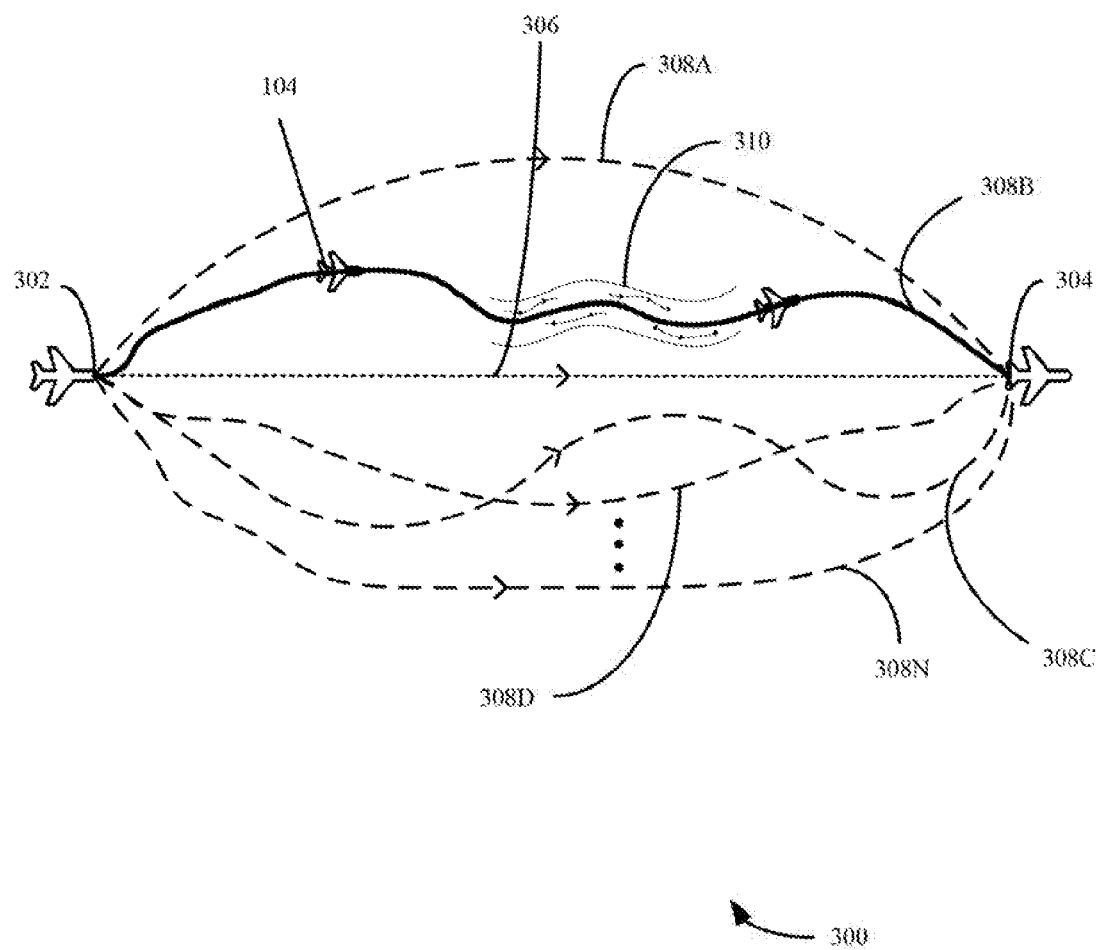
FIG. 3 is an example schematic illustrating dynamically determined multiple curved/direct paths between a source and a destination along an actual path/route while the flight is en-route to the destination.

FIG. 3 illustrates an example schematic diagram 300 showing dynamic determination of multiple alternate flight paths (e.g., curved/direct paths) 308A to 308N between a source 302 and a destination 304 along an actual path/route 306 while the aircraft 104 is en-route to the destination 304. For determining the multiple alternate flight paths 308A to 308N, the en-route flight path optimization module 112 may obtain real-time weather data, air traffic conflict data, and air space constraint data. In one example, the real time weather data is obtained from aviation weather system 114 and the air traffic conflict data and the air space constraint data are obtained from air traffic control/monitoring system 116. The real-time weather data includes weather conditions information, such as presence of tail wind, reactive wind shear conditions, temperature rise, icing, storm conditions, lightening, fog, air turbulence conditions, and presence of volcanic ash. Further, the air space constraint data may refer to data associated with airspace restrictions and/or data associated with physical ground obstacles between the origin and the destination of the aircraft in flight.

Further, the en-route flight path optimization module 112 may compute flight time savings and fuel savings for each of the alternate flight paths 308A to 308N with respect to the actual flight path 306. For example, the flight time savings and the fuel savings may be computed based on the real-time weather data, such as presence of tail winds and reactive wind shear conditions in the alternate flight paths. For example, if headwind is present along an alternate flight path, then the aircraft 104 may consume more fuel compared to the actual flight path 306 to maintain the scheduled flight time. On the other hand, if tailwind 310 is present along an alternate flight path, then the aircraft 104 may consume less fuel compared to the actual flight path 306 to maintain the scheduled flight time. Further, for maintaining the fuel consumption as that along the actual flight path 306, the aircraft 104 may consume more flight time compared the actual flight path 306 to reach to the destination 304 in presence of headwind. On the other hand, for maintaining the fuel consumption as that along the actual flight path 306, the aircraft 104 may take less flight time compared the actual flight path 306 to reach to the destination 304 in presence of tailwind 310. Similarly, the flight time savings and the fuel savings may be computed based on other such real-time weather data.

Furthermore, the en-route flight path optimization module 112 may determine an optimal flight path from the alternate flight paths 308A to 308N. The optimal flight path may be determined from the alternate flight paths 308A to 308N based on the determined flight time savings, the fuel savings and a priority for the flight time sayings and the fuel savings, in one example, the priority may be obtained from a pilot of the aircraft 104 using the input device 124A disposed in the aircraft 104. In another example, the priority may be obtained from airline authority using the input device 124B disposed in the ground station system 106.

For example, the optimal flight path may be determined by modifying a cost index (CI) associated with each of the alternate flight paths. The CI may refer to a ratio between unit time cost and unit fuel cost. In one example, if the priority is obtained for the fuel savings, the CI is modified by converting the determined fight time savings for each alternate flight path into the fuel savings. The alternate flight paths are then ranked in an order of the fuel savings using the modified CI. Similarly, if the priority is obtained for the flight time savings, the CI is modified by convening the determined fuel savings for each alternate flight path into the flight time savings. The alternate flight paths are then ranked in an order of the flight time savings using the modified CI. In both the cases, the optimal flight path is determined using the ranking of the alternate flight paths. For example, when the alternate flights paths are ranked in a descending order of the flight time savings, the alternate flight path (e.g., alternate flight path 308B as shown in FIG. 3) having maximum time savings among all other alternate flights paths (e.g., alternate flight path 308A and 308C to 308N as shown in FIG. 3) because the alternate flight path 308B has tailwind 310 which may increase the speed of the aircraft 104, thereby reducing the flight time of the aircraft 104 en-routing along the alternate flight path 308B as compared to the actual flight path 306. Therefore, the alternate flight path 308B may be selected as the optimal flight path for time savings.

After the optimal flight path is determined, the en-route flight path optimization system 102 may send optimal flight path information to the display 122 disposed in the aircraft 104 for displaying the optimal flight path information, thereby enabling the pilot of the aircraft 104 to follow the optimal flight path for reaching to the destination 304. In one example, when the en-route flight path optimization system 102 is disposed in ground station system 106, as shown in FIG. 2, the en-route flight path optimization system 102 may send the optimal flight path information to the display 122 disposed in the aircraft 104 via the network interface 120 using the computer network.

Figure 4:
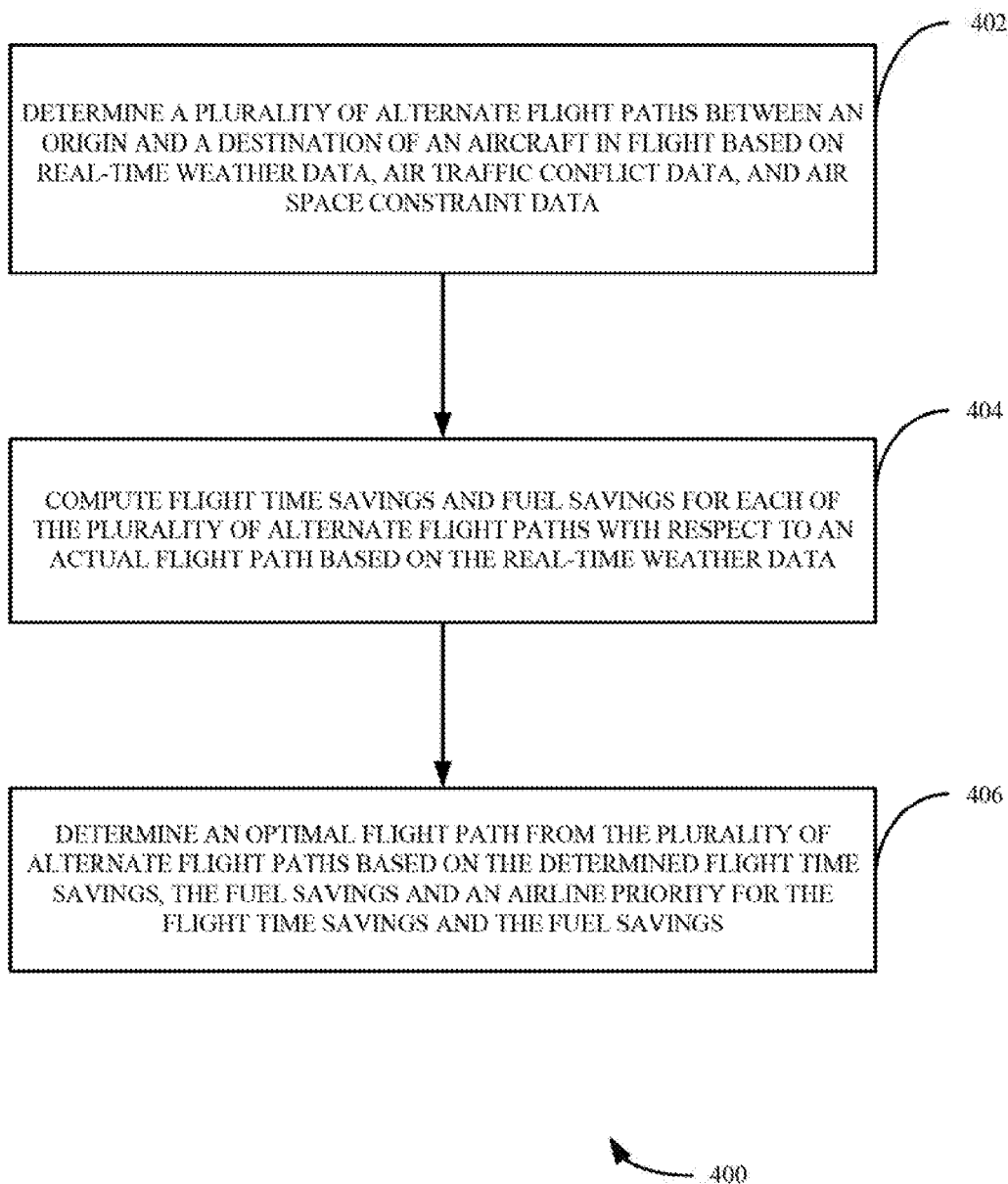
FIG. 4 is an example flow diagram showing a method for en-route flight path optimization.

Referring now to FIG. 4, which illustrates a flow diagram showing a method for en-route flight path optimization, in accordance with an embodiment. At block 402, alternate flight paths may be determined between an origin and a destination of an aircraft in flight. The flight paths may be determined based on real-time weather data, air traffic conflict data, and air space constraint data. In one example, the real time weather data is obtained from aviation weather system, and the air traffic conflict data and the air space constraint data are obtained from air traffic control/monitoring system.

At block 404, flight time savings and fuel savings for each of the alternate flight paths with respect to an actual flight path is computed. The flight time savings and fuel savings may be computed based on the obtained real-time weather data.

At block 406, an optimal flight path from the plurality of alternate flight paths is determined. The optimal flight path may be determined based on the computed flight, time savings, the file savings and a priority for the flight time savings and the fuel savings. In one example, the priority may be obtained from a pilot of the aircraft. In another example, the priority may be obtained front airline authority.

Figure 5:
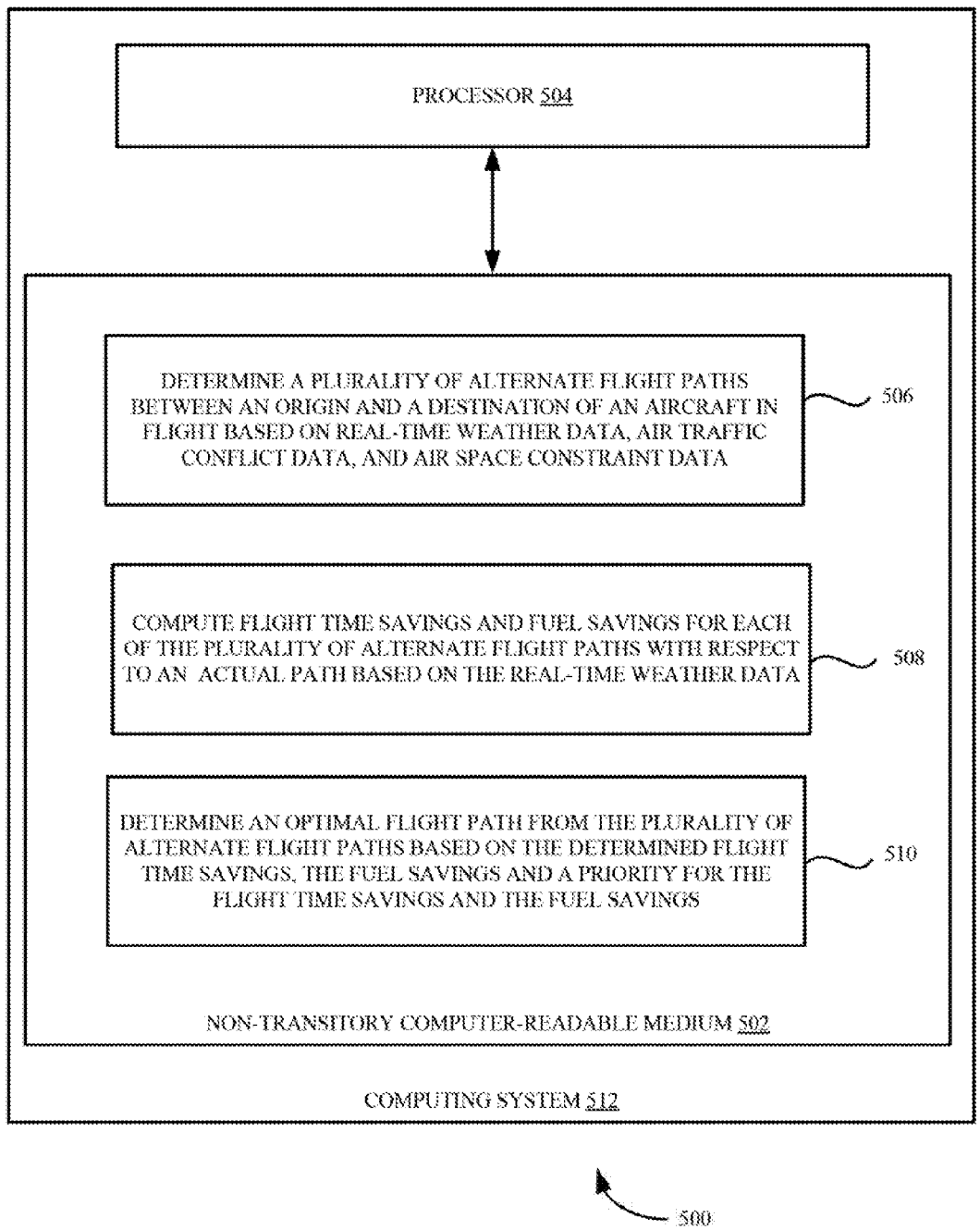
FIG. 5 is an example block diagram showing a non-transitory computer-readable medium for en-route flight path optimization.

FIG. 5 is an example block, diagram 500 showing a non-transitory computer-readable medium 502 that stores code for operation in accordance with an example of the techniques of the present application. The non-transitory computer-readable medium 502 may be included in a computing system 512. The computing system 512 may be the en-route flight path optimization system 102 as shown in FIG. 1 and FIG. 2. The non-transitory computer-readable medium 502 may correspond to any storage device that stores computer-implemented instructions, such as programming code or the like. For example, the non-transitory, computer-readable medium 502 may include non-volatile memory, volatile memory, and/or storage devices. Examples of non-volatile memory include, but are not limited to, electrically erasable programmable Read Only Memory (EEPROM) and Read Only Memory (ROM). Examples of volatile memory include, but are not limited to, Static Random Access Memory (SRAM), and dynamic Random Access Memory (DRAM). Examples of storage devices include, but are not limited to, hard disk drives, compact disc drives, digital versatile disc drives, optical drives, and flash memory devices.

A processor 504 generally retrieves and executes the instructions stored in the non-transitory computer-readable medium 502 to operate the present techniques in accordance with an example. In one example, the tangible, non-transitory computer-readable medium 502 can be accessed by the processor 504 over a bus.

For example, block 506 provides instructions which may include instructions to determine alternate flight paths between an origin and a destination of an aircraft in flight. The flight paths may be determined based on real-time weather data, air traffic conflict data, and air space constraint data. In one example, the real time weather data is obtained from aviation weather system, and the air traffic conflict data and the air space constraint data are obtained from air traffic control/monitoring system.

For example, block 508 provides instructions which may include instructions to compute flight time savings and fuel savings for each of the alternate flight paths with respect to an actual flight path. The flight time savings and fuel savings may be computed based on the obtained real-time weather data.

For example, block 510 provides instructions which may include instructions to determine an optimal flight path from the alternate flight paths. The optimal flight path may be determined based on the computed flight time savings, the fuel savings and a priority for the flight time savings and the fuel savings, in one example, the priority may be obtained from a pilot of the aircraft. In another example, the priority may be obtained from airline authority.

Although shown as contiguous blocks, the machine readable instructions can be stored in any order or configuration. For example, if the non-transitory computer-readable medium 502 is a hard drive, the machine readable instructions can be stored in non-contiguous, or even overlapping sectors.

As used herein, the processor 504 may include processor resources such as at least one of a Central Processing Unit (CPU), a semiconductor-based microprocessor, a Graphics Processing Unit (GPU), a Field-Programmable Gate Array (FPGA) to retrieve and execute instructions, other electronic circuitry suitable for the retrieval and execution instructions stored on a computer-readable medium, or a combination thereof. The processor 504 fetches, decodes, and executes instructions stored on the non-transitory computer-readable medium 502 to perform the functionalities described below. In other examples, the functionalities of any of the instructions of the non-transitory computer-readable medium 502 may be implemented in the form of electronic circuitry, in the form of executable instructions encoded on a computer-readable storage medium, or a combination thereof.

As used herein, the non-transitory computer-readable medium 502 may be any electronic, magnetic, optical, or other physical storage apparatus to contain or store information such as executable instructions, data, and the like. For example, any computer-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any computer-readable medium described herein may be non-transitory. In examples described herein, the computer-readable medium or media is part of an article for article of manufacture). An article or article of manufacture may refer to any manufactured single component or multiple components. The medium may be located either in the system executing the computer-readable instructions, or remote from but accessible to the system (e.g., via a computer network) for execution. In the example of FIG. 5, the non-transitory computer-readable medium 502 may be implemented by one computer-readable medium, or multiple computer-readable media.

In examples described herein, the host/client device may communicate with components implemented on separate devices or system(s) via a network interface device of the host. For example, the host/client device may communicate with the en-route flight path optimization system 102 via a network interface device 120 of the host/client device. In examples described herein, a "network interface device" may be a hardware device to communicate over at least one computer network. In some examples, a network interface may be a Network Interface Card (NIC) or the like. As used herein, a computer network may include, for example, a Local Area Network (LAN), a Wireless Local Area Network (WLAN), a Virtual Private Network (VPN), the Internet, or the like, or a combination thereof. In some examples, a computer network may include a telephone network (e.g., a cellular telephone network).

In some examples, instructions may be part of an installation package that, when installed, may be executed by processor 504 to implement the functionalities described herein in relation to instructions. In such examples, the non-transitory computer-readable medium 502 may be a portable medium, such as a CD, DVD, or flash drive or a memory maintained by a server from which the installation package can be downloaded and installed. In other examples, instructions may be part of an application, applications, or component(s) already installed on the computing system 512 including processor 504. In such examples, the non-transitory computer-readable medium 502 may include memory such as a hard drive, solid state drive, or the like. In some examples, functionalities described herein, in relation to FIGS. 1 through 5 may be provided in combination with functionalities described herein in relation to any of FIGS. 1 through 5.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for en-route flight path optimization, comprising:
   determining a plurality of alternate flight paths between an origin and a destination of an aircraft in flight based on real-time weather data, air traffic conflict data, and air space constraint data;
   computing flight time savings and fuel savings for each of the plurality of alternate flight paths with respect to an actual flight path based on the real-time weather data; and
   determining an optimal flight path from the plurality of alternate flight paths by modifying a cost index (CI) associated with each of the plurality of alternate flight paths based on the computed flight time savings, the fuel savings and a priority for the flight time savings and the fuel savings, wherein the CI is a ratio between unit time cost and unit fuel cost.

2. The method of claim 1, wherein determining the optimal flight path comprises:
   modifying the CI associated with each of the plurality of alternate flight paths by converting the computed flight time savings into the fuel savings for each alternate flight path when the priority is for the fuel savings;
   ranking the plurality of alternate flight paths in an order of the fuel savings based on corresponding modified cost indices; and
   determining the optimal flight path based on the ranking of the plurality of alternate flight paths.

3. The method of claim 1, wherein determining the optimal flight path comprises:
   modifying the CI associated with each of the plurality of alternate flight paths by converting the computed fuel savings into the flight time savings for each alternate flight path when the priority is for the flight time savings;
   ranking the plurality of alternate flight paths in an order of the flight time savings based on corresponding modified cost indices; and
   determining the optimal flight path based on the ranking of the plurality of alternate flight paths.

4. A method for en-route flight path optimization, comprising:
   determining a plurality of alternate flight paths between an origin and a destination of an aircraft in flight based on real-time weather data, air traffic conflict data, and air space constraint data, wherein the real-time weather data is related to weather conditions that are selected from the group consisting of presence of tail wind, reactive wind shear conditions, temperature rise, icing, storm conditions, lightening, fog, air turbulence conditions, and presence of volcanic ash;
   computing flight time savings and fuel savings for each of the plurality of alternate flight paths with respect to an actual flight path based on the real-time weather data; and
   determining an optimal flight path from the plurality of alternate flight paths based on the computed flight time savings, the fuel savings and a priority for the flight time savings and the fuel savings.

5. The method of claim 1, wherein the air space constraint data comprises information regarding airspace restrictions, air traffic and/or data associated with physical ground obstacles between the origin and the destination of the aircraft in flight.

6. A flight path optimization system, comprising:
   a processor; and
   memory coupled to the processor, wherein the memory includes a flight path optimization module having instructions to:
      determine a plurality of alternate flight paths between an origin and a destination of an aircraft in flight based on real-time weather data, air traffic conflict data, and air space constraint data;
      compute flight time savings and fuel savings for each of the plurality of alternate flight paths with respect to an actual flight path based on the real-time weather data; and
      determine an optimal flight path from the plurality of alternate flight paths by modifying a cost index (CI) associated with each of the plurality of alternate flight paths based on the computed flight time savings, the fuel savings and a priority for the flight time sayings and the fuel sayings, wherein the CI is a ratio between unit time cost and unit fuel cost.

7. The flight path optimization system of claim 6, wherein the processor executes instructions to determine the optimal flight path by:
- modifying the CI associated with each of the plurality of alternate flight paths by converting the computed flight time savings into the fuel savings for each alternate flight path when the priority is for the fuel savings;
- ranking the plurality of alternate flight paths in an order of the fuel sayings based on corresponding modified cost indices; and
- determining the optimal flight path based on the ranking of the plurality of alternate flight paths.

8. The flight path optimization system of claim 6, wherein the processor executes instructions to determine the optimal flight path by:
- modifying the CI associated with each of the plurality of alternate flight paths by converting the computed fuel savings into the flight time savings for each alternate flight path when the priority data is for the flight time savings;
- ranking the plurality of alternate flight paths in an order of the flight time savings, based on corresponding modified cost indices; and
- determining the optimal flight path based on the ranking of the plurality of alternate flight paths.

9. A flight path optimization system, comprising:
- a processor; and
- memory coupled to the processor, wherein the memory includes a flight path optimization module having instructions to:
  - determine a plurality of alternate flight paths between an origin and a destination of an aircraft in flight based on real-time weather data, air traffic conflict data, and air space constraint data, wherein the real-time weather data is related to weather conditions that are selected from the group consisting of presence of tail wind, reactive wind shear conditions, temperature rise, icing, storm conditions, lightening, fog, air turbulence conditions, and presence of volcanic ash;
  - compute flight time savings and fuel savings for each of the plurality of alternate flight paths with respect to an actual flight path based on the real-time weather data; and
  - determine an optimal flight path from the plurality of alternate flight paths based on the computed flight time savings, the fuel sayings and a priority for the flight time savings and the fuel savings.

10. The flight path optimization system of claim 6, wherein the air space constraint data comprises data associated with airspace restrictions, air traffic and/or data associated with physical ground obstacles between the origin and the destination of the aircraft in flight.

11. A non-transitory computer-readable medium having computer executable instructions stored thereon for en-route flight path optimization, the instructions are executable by a processor to:
- determine a plurality of alternate flight paths between an origin and a destination of an aircraft in flight based on real time weather data, air traffic conflict data, and air space constraint data;
- compute flight time savings and fuel savings for each of the plurality of alternate flight paths with respect to an actual path based on the real-time weather data; and
- determine an optimal flight path from the plurality of alternate flight paths by modifying a cost index (CI) associated with each of the plurality of alternate flight paths based on the computed flight time savings, the fuel savings and a priority for the flight time savings and the fuel savings, wherein the CI is a ratio between unit time cost and unit fuel cost.

12. The non-transitory computer-readable medium of claim 11, wherein, determining the optimal flight path comprises:
- modifying the CI associated with each of the plurality of alternate flight paths by convening the flight time savings into the fuel savings for each alternate flight path when the priority is for the fuel savings;
- ranking the plurality of alternate flight paths in an order of the fuel savings based on corresponding modified cost indices; and
- determining the optimal flight path based on the ranking of the plurality of alternate flight paths.

13. The non-transitory computer-readable medium of claim 11, wherein determining the optimal flight path comprises:
- modifying the CI associated with each of the plurality of alternate flight paths by converting the fuel savings into the flight time savings for each alternate flight path when the priority is for the flight time savings;
- ranking the plurality of alternate flight paths in an order of the flight time savings based on corresponding modified cost indices; and
- determining the optimal flight path based on the ranking of the plurality of alternate flight paths.

* * * * *